United States Patent Office 2,956,947
Patented Oct. 18, 1960

2,956,947
FIRE EXTINGUISHING METHOD

Clare A. Carter, South Charleston, and Durbin H. Way, Charleston, W. Va., assignors to Union Carbide Corporation, a corporation of New York No Drawing. Filed Aug. 6, 1957, Ser. No. 676,509

7 Claims. (Cl. 252—3)

This invention relates to fire extinguishing, foam forming compositions, and to a foaming agent which is capable of forming a fire extinguishing foam with all naturally occurring waters.

One method of improving the efficiency of water as a fire extinguisher is to produce a fire extinguishing foam by means of a foaming agent and apply the foam to the burning surface by means of a gaseous propellant. A suitable foaming agent should produce copious quantities of at least semistabilized foam using a minimum of mechanical energy for admixing the foaming agent and water with a gaseous propellant, such as air. The foaming power should not be appreciably affected by the usual extremes of atmospheric temperature, and by the many different sources of water, ranging in hardness from rain water to sea water. These foams should be relatively dense in order to perform efficiently in the extinguishment of Class "A" (ordinary combustibles) and Class "B" (flammable liquids, greases, etc.) fires. Furthermore, the drainage from the foam should have high wetting and penetrating powers.

The previously proposed foaming agents and foam forming compositions have some but not all of these desirable qualities. Also, the prior art has failed to provide a foaming agent with good foamability in sea water, to smother and control Class "B" fires in ships, refineries, tank farms, and oil well installations in the coastal regions. In general, the nonionic foaming agents are unsatisfactory because their aqueous solutions, while foaming readily, do not form relatively large volumes of foam. Aqueous solutions of many anionic foaming agents foam copiously and easily. However, when hard water and sea water containing relatively high concentrations of impurities are used, the precipitation of the salts (e.g., calcium and magnesium) of the foaming agent anion greatly reduces foaming. The foam reduction is caused both by loss of the foaming agent through precipitation and by the massive foam inhibition power of the tacky calcium and magnesium precipitates.

The phrase "hard water" as used in the specification and claims refers to fresh water which has flowed over or beneath the surface of the earth and dissolved various substances containing calcium and magnesium salts, the dissolved impurities constituting between about 0.1 and 1.0 percent by weight, of the water. "Sea water" as used herein refers to water containing about 3.6 percent of dissolved substances, including calcium and magnesium salts.

A principal object of the present invention is to provide a foaming agent which is capable of forming a highly efficient fire extinguishing foam with all naturally occurring waters.

Another object of the present invention is to provide a foam forming composition which possesses high foamability in sea water to smother and control Class "B" (flammable liquids, greases, etc.) fires.

A still further object is to provide a foam forming composition which possesses high foamability in all naturally occurring waters, and permits control and extinguishment of Class "A" (ordinary combustibles) and Class "B" (flammable liquid, greases, etc.) fires.

Another object is to provide a method for extinguishing fires by means of a heterogeneous foam mixture using aqueous solutions with hardness ranging from distilled water to sea water.

These and other objects and advantages of this invention will become apparent from the ensuing disclosure and appended claims.

According to this invention, these objects are accomplished by providing a fire extinguishing foam forming composition capable of producing a heterogeneous mixture of a gaseous phase in an aqueous phase, the composition including a tridecyl sulfate of a member of the alkali metal group as a foaming agent. Sodium is the preferred cation for the tridecyl sulfate anion, but other alkali metals such as lithium, potassium, rubidium, and cesium, or mixtures thereof would also be suitable. The present invention also provides a method of extinguishing fires, wherein a foam mixture is applied to the fire, the mixture containing the aforementioned foam forming composition and a gaseous propellant.

The alkyl sulfates are suitable for making dilute aqueous solutions which foam readily and extinguish fires more efficiently than untreated water, but the number and variety of these compounds suitable as foaming agents for all naturally occurring waters is severely restricted by two considerations. One is the fact that the foaming power and foam quality imparted by these sulfates to aqueous solutions declines rapidly when the alkyl group has a molecular weight of less than 155 ($R=C_{11}H_{23}$). The second consideration is the fact that the anions of the sulfates, where the alkyl group has a molecular weight of about 197 ($R=C_{14}H_{29}$) or higher, precipitate with magnesium and calcium cations in sea water and hard water. Extensive tests have indicated that only the tridecyl anion with a molecular weight of about 183 fulfills these stringent requirements.

Table I summarizes a series of comparative tests in which the foaming ability of well-known nonionic and anionic foaming agents were determined along with that of several sodium tridecyl sulfate solutions having different concentrations. In these tests both distilled water and synthetic sea water were used as the aqueous solution. In each test a 100 milliliter solution was prepared and poured into an agitator. The solution was then agitated for 30 seconds and the volume of foam produced at the end of this period was measured. Observations were continued until 50 milliliters of solution had disengaged from the foam and this time was recorded as the "half-life" or "half-drain" time of the foam; i.e., the time from the end of the agitation period to the time when 50 milliliters of solution reappeared.

Table 1
AGITATOR TESTS USING VARIOUS FOAMING AGENTS

| Wetting Agent No. | Foaming Agents | Conc. of Foaming Agent | Molecular Weight | Distilled Water | | Synthetic Sea Water [1] | |
|---|---|---|---|---|---|---|---|
| | | | | Vol. of Foam (ml.) | Half-Drain Time (Sec.) | Vol. of Foam (ml.) | Half-Drain Time (Sec.) |
| 1 | Sodium 2-butyl octyl sulfate | 0.5 | 288 | 850 | 182 | 675 | 153 |
| 2 | Sodium lauryl sulfate | 0.5 | 288 | 700 | 255 | 550 | 175 |
| 3 | Sodium tridecyl sulfate | 0.29 | 302 | 775 | 290 | 700 | 249 |
| 4 | ___do___ | 0.43 | 302 | 800 | 272 | 850 | 304 |
| 5 | ___do___ | 0.5 | 302 | 825 | 277 | 825 | 238 |
| 6 | ___do___ | 0.65 | 302 | 725 | 267 | 575 | 215 |
| 7 | Sodium tetradecyl sulfate | 0.41 | 316 | 850 | 253 | 350 | 30 |
| 8 | Sodium 2-hexyldecyl sulfate | 0.50 | 344 | 750 | 301 | 325 | 49 |
| 9 | Sodium alkyl aryl sulfonate | 0.46 | approx. 348 | 750 | 235 | 350 | 62 |
| 10 | Sodium dihexyl sulfosuccinate | 0.50 | 388 | 700 | 224 | Precipitates | Precipitates |

[1] Synthetic sea water contains the following salts in grams per liter: $MgSO_4 \cdot 7H_2O$ 3.87, $MgCl_2$ 2.955, $CaSO_4 \cdot 2H_2O$ 1.588, NaCl 24.337, KCl 0.676. KBr 0.063, and KI 0.056.

In general, it was found that if the agitator test using synthetic sea water produced more than 600 milliliters of foam and had a half-drain time of over 200 seconds, the foaming agent in question would perform well in fire extinguishment tests, particularly for class "B" fires. Thus, Table I clearly shows that sodium tridecyl sulfate was the only efficient foaming agent for both distilled water (analogous to rain water, and seat water. This table also indicates that the upper limit for the preferred range of sodium tridecyl sulfate concentration is about 0.43 percent by weight, since the foam volume and half-drain times for the 0.5 percent synthetic sea water sample were lower than the corresponding figures for the 0.43 percent sample.

The final appraisal of the foaming agent is, of course, by fire-extinguishment tests. Table II summarizes Class "B" fire tests which were also conducted to evaluate various foaming agents. In each of these tests, a 1-inch layer of gasoline was floated on water to provide a freeboard of 6 inches in a round tub having a surface area of 2 square feet. The fuel was ignited and permitted to burn for 5 seconds at which time the foam forming composition was applied at a rate of 0.11 gallons per minute, per square foot of surface area, using compressed air as the propellant.

Table II
CLASS "B" FIRE TESTS

| Wetting Agent No. (See Table I for concentrations) | Foaming Agent | Net Extinguishment Time, Seconds | |
|---|---|---|---|
| | | Tap Water | Synth. Sea Water |
| 2 | Sodium lauryl sulfate | No control [1] | |
| 5 | Sodium tridecyl sulfate | 90 | 75. |
| 3 | ___do___ | 100 | 72. |
| 4 | ___do___ | 110 | 62. |
| 6 | ___do___ | 77 | 88. |
| 7 | Sodium tetradecyl sulfate | 100 | No control. |
| 11 | Sodium dihexyl sulfosuccinate | No control | |

[1] "No control" means that the fire was not under control after 2 minutes' application of fluid.

These tests correlate well with those of Table I and supports the conclusion that sodium tridecyl sulfate is a foaming agent capable of producing prolific quantities of foam in aqueous solutions with hardness ranging from distilled to sea water, and that none of the previously disclosed foaming agents will perform efficiently in this entire hardness range. These tests also indicate that the present invention provides an effective method of extinguishing fires, whereby a heterogeneous foam mixture containing a gaseous propellant and an alkali metal tridecyl sulfate solution is applied to the burning surface.

Another series of tests were conducted to determine the most effective concentration of sodium tridecyl sulfate, the test equipment and procedure being the same as previously described for the tests summarized in Table II. These final tests are summarized in Table III.

Table III
CLASS "B" FIRE TESTS USING VARIOUS FOAMING AGENT CONCENTRATIONS

| Concentration of Sodium Tridecyl Sulfate, (Wgt. percent) | Net Extinguishment Time (Seconds) | |
|---|---|---|
| | Tap Water Solution | Synthetic Sea Water Solution |
| 0.09 | No extinguishment | |
| 0.14 | 100 | 75 |
| 0.23 | 71 | 95 |
| 0.29 | 100 | 72 |
| 0.30 | 128 | 120 |
| 0.39 | 149 | |

These tests indicate that for extinguishment of gasoline fires, the preferred sodium tridecyl sulfate concentration range is from about 0.14 to 0.29 percent by weight.

The precursor of the tridecyl group is the thirteen-carbon alcohol, tridecanol. This alcohol is preferably a mixture of isomers derived from the hydrogenation of tridecanal isomers made by the hydroformylation of tetrapropylene. However, the tridecanols made from other dodecenes, or by, for example, condensation reactions, should yield the tridecyl sulfate foaming agent of the present invention. Any tridecanol ($C_{13}H_{27}OH$) of the general structure $$\begin{matrix} R_1 \\ \phantom{x} \diagdown \\ \phantom{xxx} CHOH \\ \phantom{x} \diagup \\ R_2 \end{matrix}$$

would be expected to be suitable, where $R_1$ can be either H or an alkyl group, $R_2$ is an alkyl group, and where the longest chain in the molecule comprises not less than seven carbon atoms.

The tridecanol may be sulfated using known sulfation procedures, and the tridecyl hydrogen sulfate thus formed may be neutralized with an alkali such as sodium hydroxide to form the product, sodium tridecyl sulfate. As previously discussed, other alkali metals or mixtures thereof could be substituted in the process to make an acceptable product.

The terms and expressions which have been employed are used as terms of description and not of limitation, and there is no intension in the use of such terms and expressions of excluding any equivalents of the features described. It should be recognized that various modifi-

What is claimed is:

1. A method for extinguishing fires which comprises applying thereto a heterogeneous foam mixture of a gaseous phase in an aqueous phase, the foam mixture containing a gaseous propellant, and an alkali metal tridecyl sulfate salt as the foaming agent for said aqueous phase.

2. A method for extinguishing fires which comprises applying thereto to heterogeneous foam mixture of a gaseous phase in an aqueous phase, the foam mixture containing a gaseous propellant, and sodium tridecyl sulfate as the foaming agent for said aqueous phase.

3. A method according to claim 2 for extinguishing fires, in which said sodium tridecyl sulfate comprises between about 0.14 percent and 0.43 percent by weight of said aqueous phase.

4. A method for extinguishing fires which comprises applying thereto a heterogeneous foam mixture of a gaseous phase in a sea water liquid phase, the foam mixture containing a gaseous propellant, and sodium tridecyl sulfate as the foaming agent for such liquid phase.

5. A method for extinguishing fires which comprises applying thereto a heterogeneous foam mixture of a gaseous phase in a hard water liquid phase, the foam mixture containing a gaseous propellant, and sodium tridecyl sulfate as the foaming agent for such liquid phase.

6. A method for extinguishing fires which comprises applying thereto a heterogeneous foam mixture of a gaseous phase in a sea water liquid phase, the foam mixture containing a gaseous propellant, and an alkali metal tridecyl sulfate salt as the foaming agent for such liquid phase.

7. A method for extinguishing fires which comprises applying thereto a heterogeneous foam mixture of a gaseous phase in a hard water liquid phase, the foam mixture containing a gaseous propellant, and an alkali metal tridecyl sulfate salt as the foaming agent for such liquid phase.

References Cited in the file of this patent

UNITED STATES PATENTS

| | | |
|---|---|---|
| 1,968,796 | Bertsch | July 31, 1934 |
| 2,114,042 | Bertsch | Apr. 12, 1938 |
| 2,165,997 | Daimler et al. | July 11, 1939 |
| 2,609,397 | Gresham | Sept. 2, 1952 |
| 2,655,480 | Spitzer et al. | Oct. 13, 1953 |
| 2,766,212 | Grifo | Oct. 9, 1956 |

FOREIGN PATENTS

| | | |
|---|---|---|
| 766,706 | Great Britain | Jan. 23, 1957 |